United States Patent [19]

Kadow

[11] 3,737,859

[45] June 5, 1973

[54] SELECTION MATRIX PROTECTED AGAINST OVERCHARGING AND DESIGNED FOR A DATA MEMORY HAVING RANDOM ACCESS

[75] Inventor: Hermann Kadow, Vaterstetten, Germany

[73] Assignee: Siemens Aktiengesellschaft, Berlin and Munich, Germany

[22] Filed: Mar. 21, 1972

[21] Appl. No.: 236,696

[30] Foreign Application Priority Data

Mar. 30, 1971 Germany....................P 21 15 371.9

[52] U.S. Cl.......340/166 R, 324/73 PC, 340/174 AC

[51] Int. Cl...........................G01r 15/12, H04q 9/00

[58] Field of Search...................340/166 R, 146.1 C, 340/146.1 AB, 174 AB, 174 KC, 174 AC; 324/73 PC

[56] References Cited

UNITED STATES PATENTS 3,188,499 6/1965 Xylander.......................340/174 KC 3,683,370 8/1972 Nagano......................340/146.1 AB 3,474,421 10/1969 Stein.............................340/174 AC

*Primary Examiner*—Donald J. Yusko

*Attorney*—Carlton Hill, Benjamin H. Sherman and J. Arthur Gross et al.

[57] ABSTRACT

A selection matrix for a data memory having random access and which is dimensioned for a medium loading such as exists during normal operation and to which a control device is assigned which ensures that even in exceptional cases such as constant order the selection circuits are not overloaded the selection matrix employing a control system constructed as a selection matrix, two groups of control signal generators each corresponding to lines and columns of the selection matrix by which individual control signal generators may be selected.

3 Claims, 3 Drawing Figures

SELECTION MATRIX PROTECTED AGAINST OVERCHARGING AND DESIGNED FOR A DATA MEMORY HAVING RANDOM ACCESS

BACKGROUND OF THE INVENTION

1. Field of the Invention

This invention relates to a selection matrix for a data memory having random access, the selection matrix being dimensioned for a medium loading occurring during normal operation and assigned a control device which prevents the selection circuits of the matrix from being overloaded due to excessive access, even in the exceptional case of constant order of the same address.

2. Description of the Prior Art

A selection matrix described in my pending application entitled "Selective Circuit for a Random Access Storage," U.S. Ser. No. 70,752, filed Sept. 9, 1970 is not, as was heretofore, designed according to the loading encountered during constant operation, but according to loading encountered during normal operation whereby a considerably less loss is encountered. This dimensioning or design of the selection circuits in the selection matrix takes into consideration the fact that during normal operation of a memory having random access the ordered address constantly changes. The only exceptions to this are interferences or loadings encountered during a test run. In such cases, one and the same address can be ordered during a random period of time and therefore one and the same selection circuit is constantly operated and overloaded. Therefore, a control device is assigned to the selection matrix, which device contains a control signal generators adapted to simulate the thermal condition of a selection circuit. According to an embodiment of such a control device as set forth in the aforementioned U.S. application, it was suggested to provide the control of the selection circuits based on their address signals and to design the control device in such a way the the $k$ address locations are each assigned a circuit arrangement or, in the case of a positive or negative address signal, each assign a pair of circuit arrangements for the creation of a control signal to inhibit overloading. It is therefore assumed that a complete address for one storage location is composed of a sequence of $k$ bits. Therefore, an effective control device can be constructed from a limited number of control signal generators which is considerably less expensive than a control device in which a control signal generator is assigned to each selection circuit. However, without the strict assignment of the control signal generator to a selection circuit, the average loading of this selection circuit during the course of many storage cycles can not be accurately determined. The matter is rendered even more difficult by the fact that different loadings are encountered during write and read operations. However, the loading of a selection circuit in the preceeding storage cycles is the determining factor for the instantaneous loss performance in a selection circuit. The result is that as a selection matrix can be designed for less loss performance, the better the so called loading of the individual selection circuits is taken into consideration in the control device.

SUMMARY OF THE INVENTION

In view of the foregoing, the primary object of the present invention is to provide a control device which is assigned to the selection matrix and which is designed in such a way that the loading history of individual selection circuits is accurately considered in the easiest possible manner without thereby causing the circuit performance for the control device to increase to any great extent.

According to the invention, the foregoing object is realized and the underlying problem thereof solved in that a control arrangement which is designed like a selection matrix is provided with two groups of control signal generators respectively corresponding to the lines and columns of the matrix, from which and analogous to the line and column selection of a selection matrix, a control signal generator can be selected. Such a designed control arrangement is more readily apparent in its logical structure than the aforementioned suggested solution since in this case each control signal generator is assigned certain selection circuits. Through this assignment, the loading history of the selection switches can be accurately determined. In case of equal operational security of a memory, a smaller loss performance for the selection switches can be assumed, since the overload cases are to be more accurately determined.

BRIEF DESCRIPTION OF THE DRAWINGS

The invention, its organization, construction and operation will be best understood from the following detailed description of a preferred embodiment thereof taken in conjunction with the accompanying drawing, in which.

DESCRIPTION OF THE PREFERRED EMBODIMENT

Figure 1:
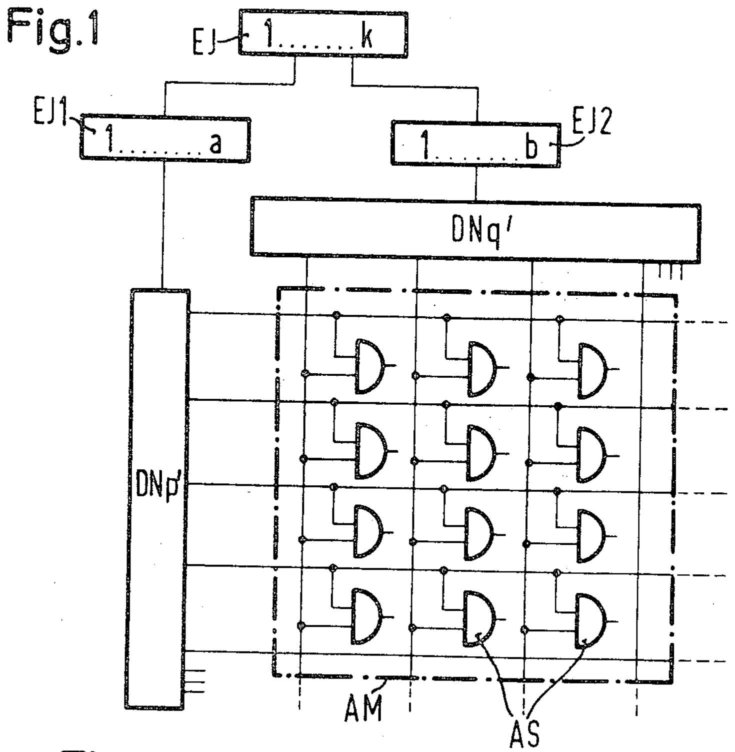
FIG. 1 is a block diagram representation of a generally known selection scheme for the selection of certain selection circuits from a selection matrix.

Basically, a single selection should be made from $n$ possibilities with a selection matrix AM. During application in the operational memory of a data processing device, this means in most cases the selection of a certain selection circuit AS. The information as to which is the desired selection circuit AS is contained in the input information EJ which is schematically illustrated in FIG. 1 and in most cases is found in the form of a $k$ digit binary number whereby $n$ selection circuits can be addressed as AS and the following relationship applies.

$$n = 2^k \quad (1)$$

For a simple decoding the selection circuits AS are arranged in a selection matrix AM composed of $p$ lines and $q$ columns. In case of a total of $n$ selection circuits AS, the following relationship applies.

$$p \cdot q = n \quad (2)$$

After a pre-coding in the coding networks DN$p'$ or DN$q'$ which define a certain line or column of the selection matrix AM with a selection of 1 out of $p$ and 1 out of $q$, the individual selection circuit AS is activated which is coupled to the chosen column and chosen line in accordance with the coincidence principle.

The information concerning the selection of 1 out of $p$ and 1 out of $q$ which must be made exists in two parts EJ1 and EJ2, respectively, of the input information EJ in the form of an $a$-digital or $b$-digital binary number. It is therefore quite obvious that the following relations apply.

$$a + b = k, \text{ and} \tag{3}$$

$$p = 2^a \text{ or } q = 2^b \tag{4}$$

In the special case of a quadratic selection matrix AM, the result is $a = b$ or $p = q$ and therewith also $2a = 2b = k$. This explanation of the previously known scheme for decoding input information EJ has been given prior to a discussion of the illustrative embodiment in order to explain the analogous structure of a control device which is assigned to this selection matrix AM.

Figure 2:
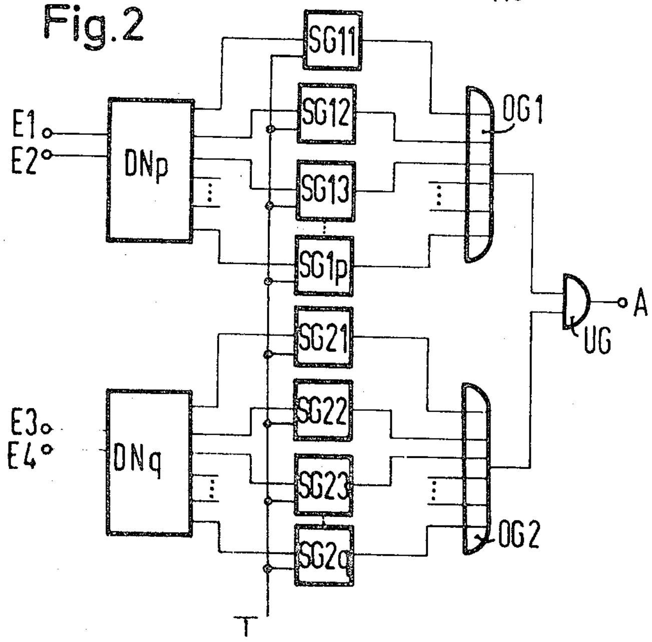
FIG. 2 is a schematic diagram of a control device assigned to a selection matrix according to the present invention.

Such a control device is illustrated in FIG. 2. In order to control the $n$ selection circuits AS of the selection matrix AM, two groups of control signal generators SG11 . . . SG1p and SG21 . . . SG2q are provided. EAch control signal generator is connected with an input to align carrying a cyclic timing signal T and can therefore be activated at a certain time for the duration of the cycle signal T. Thereby the different performances during read or write procedures can be taken in consideration. Another input of each of these control signal generators is each connected with an output of a decoding network DN$p$ or DN$q$. These two decoding networks DN$p$ and DN$q$ are constructed analogously as the decoding networks DN$p'$ and DN$q'$ connected to the selection matrix AM in FIG. 1. The partial information EJ1 or EJ2 is directed to respective ones of the decoding networks by way of the schematically shown inputs E1–E4. Since the selection addresses are provided as binary numbers, the number of inputs of each decoding network depends in reality on the number of locations by which a partial address $p$ or $q$ can be expressed. In the two decoding networks DNp and DNq 1 out of $p$ or 1 out of $q$ choices, corresponding to a line or column selection, is possible. Corresponding to this choice in each case one of the control signal generators SG11–SG1$p$ or SG21–SG2$q$ is chosen in each group.

Figure 3:
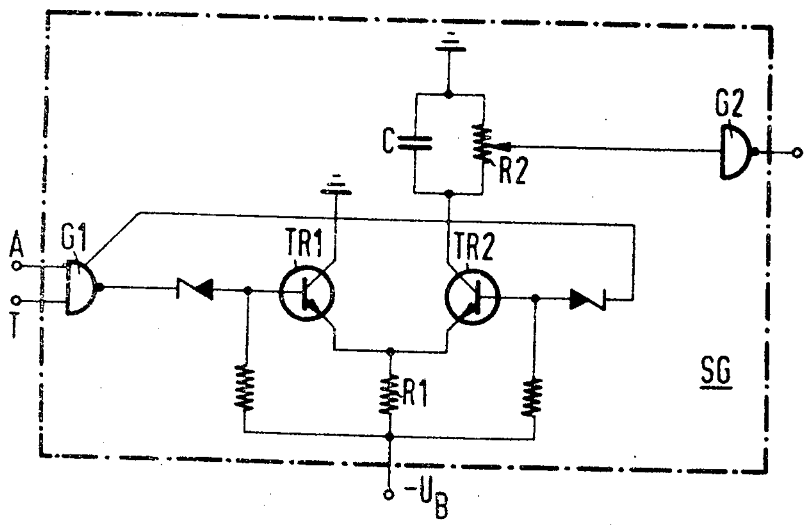
FIG. 3 is a schematic circuit diagram of a control signal generator.

In FIG. 3, an address signal is fed to the AND circuit G1 via the input A, and via the input T a timing signal is fed to the AND circuit G1. This address signal at the inlet A corresponds, for instance, to the positive signal state of one of $k$ address positions. The timing signal which is fed to the input T solves two tasks: first it determines a certain instant at which the address signal is to become effective; and furthermore, a certain operational state of the storer is reflected by means of the length of time of the timing signal, which operational state might consist of a pure succession of recording or reading processes, but which might also consist of a succession of recording and reading processes. Both signals are logically linked by means of the AND circuit G1 and they operatively control a transistor TR2 as long as the timing signal is applied thereto. Thereby, the base of the transistor TR2 is connected with the uninverted output of the AND circuit G1, via a break-down diode. The transistor TR1 is barred from conduction at this time since its base is connected with the inverted output of the AND circuit G1, via a further break-down diode. The emitters of both transistors TR1 and TR2 are connected to the negative operating voltage - $U_B$ via a common emitter resistance R1. A time-determining circuit — consisting of a condenser C and an adjustable resistor R2 which are connected parallel — is arranged in the collector circuit of the second transistor TR2 which time-determining circuit, on the other hand, is connected to earth potential. If a pulse signal at the input A drives the transistor TR2 hard, during the time when the pulse signal is applied to the input T, the condenser C will charge. This charge is determined by the time constant which results from the condenser C itself, the emitter resistor R1, the adjustable resistor R2 and the finite resistance of the transistor TR2 is an opened state. Mainly the choice of the magnitude of the adjustable resistor R2 offers the possibility to design this time constant in a way that the voltage developed across the condenser C corresponds to the temperature increase in the critical construction members of a selection circuit which is driven hard by means of a given address. Such an imitation of the thermal behavior of a selection circuit, however, is only then correct when the thermal transforming function of the temperature of the critical construction member is proportional. This is given to a practically sufficient degree with semiconductors and resistors in which the proportionality factor is determined by the transformed power.

The AND circuit G1 blocks if the timely coincidence of address signal and timing signal is not given. In this case, the transistor TR1 will be opened, and the condenser can discharge via the parallel-connected resistor R2. If this RC member is suitably dimensioned, this discharge process will also find place analogous to the temperature decrease in a selective circuit in the intervals. Thus, the voltage at the condenser C represents an exact imitation of the temperature in the critical construction member of a selection circuit. Or, in other words, the condenser C forms an analog memory for the succession of calls of a certain selective circuit.

The voltage at condenser C itself, or a part of it, can be evaluated by the fact whether with the critical construction member a certain given thermal limit is already exceeded. This is obtained in the circuit arrangement shown in FIG. 3 in a way that the adjustable tap of the resistor R2 is connected with the input of an inverter circuit G2. If the input signal which is fed to the inverter circuit G2 in this way, exceeds a certain input threshold value, the inverter circuit G2 will be switched through, and a control signal will be provided at its output, which control signal indicates if a critical threshold value of the temperature in a selection circuit is exceeded.

The outputs of the control signal generators of each group are interconnected by way of respective OR gates OG1, OG2. Both OR gates OG1 and OG2 are connected by way of an AND gate UG having an output A for providing a generated control signal.

In order to explain the function of the control device described in FIG. 2, it is assumed that in processing a program in subsequent storage cycles, one storage location is continuously called, i.e. also only one selection circuit is operated. Also, the partial information EJ1 or EJ2 which is directed to the decoding networks DNp or DNq by way of the information inputs E1, E2 and E3, E4 do not change. Further, by way of the decoding networks DNp and DNq, continuously the same control signal generators, e.g. SG11 and SG21 are chosen. These selected control signal generators as well as all other control signal generators receive the cycle signal T formed corresponding to a read or write function during the active storage cycles and thereby the selected control signal generators SG11 and SG21 are activated during the duration of this cycle signal T. This means that the RC timing circuits provided for simulating the thermal condition of a selection circuit must be charged on these control signal generators SG11, SG21. In case of a constant order the voltage at the capacitor of the RC timing circuit in a certain storage cycle exceeds the given threshold value of the control signal generator which corresponds to the critical thermal limit of the selection circuit. The control signal generator SG11 or SG21 creates a control signal which is supplied by way of the OR gates OG1 or OG2 to the AND gate UG. This signal releases an evaluated control signal at the output A of the control device if the coincidence conditions for the AND gate are fulfilled, i.e. if both inputs of the AND gate have true UG control signals.

There are several possibilities for the evaluation of this control signal. Which one of these possibilities is advisable in the individual case depends on the design of the selection circuits and also on the organization of the memory. One of the possibilities which offers itself and similar to that set forth in my aforementioned application is to reduce the cycle sequence i.e. the ratio of the number of storage cycles with respect to a given period by means of the control signal. It is feasible to couple the output A of the control device shown in FIG. 2 with a number of subsequently arranged further control signal generators and to further reduce the cycle sequence in stages any time a further control signal of this sequence releases an output signal. Such an evaluation of the control signal would be practical if the selection circuits in the selective matrix are designed in such a way that their critical thermal limit is already reached in a constant order within a few storage cycles. However, the tolerances in the control signal generator must be taken into account so that in the case of a maximum error of the control device the selection circuits are prevented from being undesirably unloaded.

Another possibility is provided that if the design of the selection circuit takes place in such a way that during computer operation with a program loop only a few storage locations are called upon cyclically with constant repetition the memory is still operable with the highest cycle sequence. In such a case the selection circuits must be designed for a slightly higher loss performance. Correspondingly, the RC timing circuits of the control signal generators must also be designed in such a way that their stored charge history comprises a larger period of time or a larger number of storage cycles, i.e. that the control signal generators become active at a later time. If then at the output A of the control device shown in FIG. 2 an evaluated control signal occurs, this signal can be used directly to block further storage orders for the duration of the control signal. This is permissible because a further loading of the already overloaded selection circuit must be avoided by all means, on the other hand, the storage order is instantaneously released if by chance or caused by program interruption another storage location is ordered and another selection circuit is operated. This second possibility only arises with an assignment of the control device to the selection circuits of the selection matrix according to the principles of the present invention and is particularly advantageous because they offer a great security with respect to overloading of the selection circuits due to their simplicity.

Although I have described my invention by reference to a specific illustrative embodiment thereof many changes and modifications of the invention may become apparent to those skilled in the art without departing from the spirit and scope of my invention and it is to be understood that I intend to include within the patent warranted hereon all such changes and modifications as may reasonably and properly be included within the scope of my contribution to the art.

I claim:

1. A selection matrix for a data memory having random access, comprising: a matrix including a plurality of first control signal generators and a plurality of second control signal generators corresponding to columns and rows of the matrix and means for selecting a control signal generator from each plurality for periods of time corresponding to read or write operations of the memory, said control signal generators each including a timing circuit and operable to provide their respective control signals when the selection time is greater than the time defined by the timing circuits.

2. A selection matrix according to claim 1, wherein said means for selecting includes a pair of decoding networks connected to the respective pluralities of first and second control signal generators for receiving and decoding signals which identify separate control signal generators.

3. A selection matrix according to claim 1, comprising first and second OR gates connected to and logically combining the outputs of the respective pluralities of control signal generators, and an AND gate connected to and logically combining the outputs of said OR gates, said AND gate having an output for providing an output control signal upon activation of a control signal generator from each of said pluralities of control signal generators.

* * * * *